United States Patent Office 3,378,389
Patented Apr. 16, 1968

3,378,389
1,3 - DIPHENYL PYRAZOLINES AND METHOD FOR BRIGHTENING SYNTHETIC MATERIAL THEREWITH
Carl-Wolfgang Schellhammer, Opladen, and Annemarie Wagner, Leverkusen, Germany, assignors to Farbenfabriken Bayer Aktiengesellschaft, Leverkusen, Germany, a German corporation
No Drawing. Filed Mar. 26, 1963, Ser. No. 267,920
Claims priority, application Germany, Mar. 31, 1962, F 36,436
11 Claims. (Cl. 117—33.5)

The present invention relates to pyrazoline compounds; more particularly it concerns pyrazoline compounds of the general formula

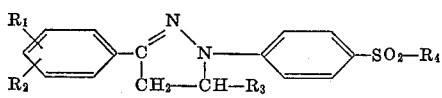

wherein $R_1$ and $R_2$ stand independently of each other for hydrogen, halogen, alkyl or alkoxy, $R_3$ stands for hydrogen or the radical

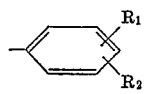

and $R_4$ stands for an alkyl or aryl radical which may be substituted by halogen or cyano, by carboxyl, sulfone or substituted amino groups or for the residue

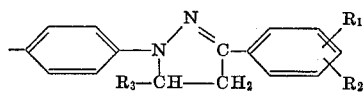

The pyrazoline compounds of the formula given above can be prepared in various ways, for example by the action of sulfone group-containing phenylhydrazines on vinyl-aryl ketones, such as, for example, on benzal acetophenone, on ω-halopropiophenones or on the salts of aminoethyl-aryl ketones; it is also possible in some cases to cause substituted styrenes to react with 3-aryl-sydnones, 1,3-diaryl-pyrazolines being formed while carbon dioxide is split off.

The pyrazoline compounds of the present invention which are nearly colourless, blue-fluorescent compounds, can be successfully used as brightening agents in the customary manner at room or elevated temperatures; pyrazoline compounds which are soluble in water, are expediently employed in the form of an aqueous solution, and pyrazoline compounds which are not soluble in water, may be used in the form of aqueous dispersions, optionally with the aid of dispersing agents. Under certain conditions the pyrazoline compounds can also be used in the form of solutions in organic solvents. The pyrazoline compounds of the invention, especially the compounds which are barely soluble in water, may also be incorporated in casting or spinning masses which are used for the production of artificial articles such as foils, fibres, filaments or the like. The quantities required for the purpose of brightening may vary within wide limits; they can easily be determined by preliminary experiments and are, as a rule, far below 1 percent by weight, referred to the material to be brightened.

The pyrazoline compounds of the invention can be applied for the brightening of materials of the most varied kind, for example, for the brightening of textile materials, paper, leather and soaps. They are particularly suited for the brightening of synthetic fibres, such as, for example, polyacrylonitrile, polyamide or cellulose ester fibres. For this purpose, they can also be used in combination with washing agents. The brightening effects obtained possess a high fastness to light. It is also noteworthy that the pyrazoline compounds of the invention, after incorporation in plastic masses, for example in soft-polyvinyl chloride, yield brightening effects which are more intense and faster to light than the effects achieved by comparable known arylpyrazoline compounds containing sulfonic acid or sulfonamide groups as they are described for example, in German patent specifications Nos. 966,411 and 1,080,-963.

The following examples serve to illustrate the invention without, however, limiting its scope.

Example 1

A fabric of, for example, polyacrylonitrile or cellulose acetate fibres is introduced at 20° C. in a liquor-to-goods ratio of 40:1, into an aqueous bath which contains per litre 0.0075 to 0.075 g. of 1-(p-methyl-sulfonylphenyl)-3-phenylpyrazoline. The bath is then slowly heated to 50–60° C. and maintained at this temperature for 20 to 40 minutes, while the fabric is moderately moved in the bath. The fabric is subsequently rinsed and dried. The textile material thus treated is brightened in a very beautiful reddish shade.

The 1-(-methyl-sulfonyplhenyl) - 3 - phenylpyrazoline used as brightening agent was prepared from ω-dimethylaminopropiophenone hydrochloride and (p-hydrazinophenyl)-methyl sulfone by customary methods and had a melting point of 170° C.

Instead of the above-mentioned compound, it is also possible to use, with equal success, the 1-(p-methyl-sulfonylphenyl) - 3 - (p-chlorophenyl)-pyrazoline of melting point 184° C., obtainable from p,β-dichloropropiophenone and (p-hydrazinophenyl)-methyl sulfone, or the 1-(p-chloromethylsulfonyl-phenyl)-3-p-chlorophenyl pyrazoline of melting point 220° C., obtainable from p,β-dichloro-propiophenone and chloromethyl-(p-hydrazinophenyl)-sulfone.

Example 2

1 g. of 1-(p-methylsulfonyl-phenyl)-3-p-chlorophenyl pyrazoline is incorporated on a roller in 1000 g. of opaque soft polyvinyl chloride. The material is excellently brightened and shows a pleasant reddish shade.

Excellent brightening effects are likewise achieved by using in the above examples, instead of the pyrazoline sulfone compounds indicated therein, one of the pyrazoline sulfone compounds which are listed in the following table as examples.

6. 1-p-methyl sulfonyl-phenyl)-3-p-chlorophenyl pyrazoline.

TABLE $$R_1\text{-}\underset{R_2}{\phantom{R_2}}\phi\text{-}C(\text{=}N\text{-}N(\text{-}\phi\text{-}SO_2\text{-}R_4))\text{-}CH_2\text{-}CH\text{-}R_3$$

| R₁ | R₂ | R₃ | R | M.P. (° C.) |
|---|---|---|---|---|
| —O—CH₃ | —H | —H | —CH₃ | 249 |
| —Cl | —Cl | —H | —CH₃ | 215 |
| —O—CH₃ | —H | —H | —C₂H₅ | 174 |
| —Cl | —H | —H | —C₂H₅ | 210–213 |
| —Cl | —Cl | —H | —C₂H₅ | 178 |
| —Cl | —H | —H | —CH₂—COOH | -------- |
| —Cl | —H | —H | —CH₂—CH₂—CN | -------- |
| —Cl | —H | —H | —CH₂—CH₂—SO₂—CH₃ | -------- |
| —Cl | —H | —H | —CH₂—CH₂—N(CH₃)(CH₃) | -------- |
| —Cl | —H | —H | —CH₂—CH₂—COOH | 183–184 |
| —H | —H | —C₆H₅ | —CH₃ | 200 |
| —Cl | —H | —C₆H₅ | —CH₃ | 198 |
| —H | —H | —C₆H₅ | —C₂H₅ | 190–191 |
| —OCH₃ | —H | —H | 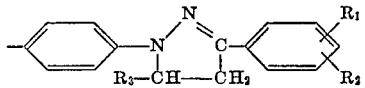 | 177 |
| —Cl | —H | —H | 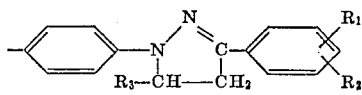 | 174 |

We claim:
1. A method for brightening synthetic materials selected from the group consisting of polyacrylonitrile, polyamide and cellulose esters comprising impregnating said materials with a heated aqueous solution or a dispersion containing as active ingredient, a brightening amount of a compound of the formula

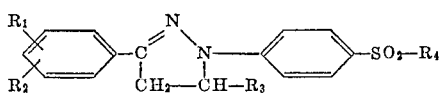

wherein $R_1$ and $R_2$ are independently defined as members selected from the group consisting of hydrogen, halo, alkyl, and alkoxy; $R_3$ is a member selected from the group consisting of hydrogen and

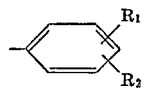

and
$R_4$ is a member selected from the group consisting of alkyl, haloalkyl, cyanoalkyl, carboxyalkyl, methyl sulfonyl substituted alkyl, dimethylamino alkyl and

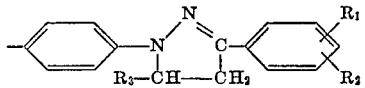

2. The method of claim 1 wherein the pyrazoline compound is 1-(p-methylsulfonyl-phenyl)-3-p-chlorophenyl pyrazoline.

3. The method of claim 1 wherein the pyrazoline compound is 1 - (p - ethylsulfonyl - phenyl)-3-p-chlorophenyl pyrazolone.

4. The method of claim 1 wherein the pyrazoline compound is 1-(p-methyl-sulfonylphenyl)-3-phenyl pyrazoline.

5. The method of claim 1 wherein the pyrazoline compound is 1-(p-chloromethylsulfonyl-phenyl)-3-p-chlorophenyl pyrazoline.

7. 1-(p-ethylsulfonyl-phenyl)-3-p-chlorophenyl pyrazoline.

8. 1-(p-methyl-sulfonylphenyl)-3-phenyl pyrazoline.

9. 1 - (p - chloromethylsulfonyl - phenyl)-3-p-chlorophenyl pyrazoline.

10. A compound of the formula

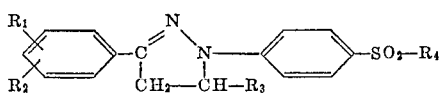

wherein $R_1$ and $R_2$ are independently defined as members selected from the group consisting of hydrogen, halo, alkyl, and alkoxy; $R_3$ is a member selected from the group consisting of hydrogen and

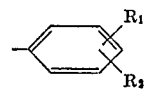

and
$R_4$ is a member selected from the group consisting of alkyl, haloalkyl, carboxy alkyl, cyanoalkyl, methylsulfonyl substituted alkyl, dimethylamino-alkyl and

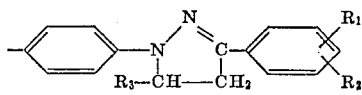

11. A compound of

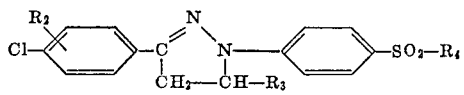

wherein $R_2$ is a member selected from the group consisting of hydrogen, halo, alkyl, and alkoxy; $R_3$ is hydrogen and $R_4$ is a member selected from the group consisting of methyl and chloromethyl.

(References on following page)

References Cited

UNITED STATES PATENTS

| | | | |
|---|---|---|---|
| 2,610,969 | 9/1952 | Kendall et al. | 260—310 |
| 2,639,990 | 5/1953 | Kendall et al. | 117—33.5 |
| 2,640,056 | 5/1953 | Kendall et al. | 117—33.5 |
| 2,740,793 | 4/1956 | Kendall et al. | 260—310 |
| 3,131,079 | 4/1964 | Wagner et al. | 260—310 |
| 3,133,080 | 5/1964 | Sarkor et al. | 260—310 |
| 3,135,742 | 6/1964 | Wagner et al. | 117—33.5 |
| 2,986,528 | 5/1961 | Siegrist et al. | 252—301.2 |
| 3,005,779 | 10/1961 | Ackermann et al. | 252—301.2 |
| 2,454,075 | 11/1948 | Mastin | 260—310 |
| 2,985,593 | 5/1961 | Broderick et al. | 260—310 |

FOREIGN PATENTS

| | | |
|---|---|---|
| 871,196 | 6/1961 | Great Britain. |
| 1,008,569 | 5/1957 | Germany. |

WILLIAM D. MARTIN, *Primary Examiner.*

N. S. RIZZR, *Examiner.*

S. W. ROTHSTEIN, N. T. TROUSOF, T. G. DAVIS,
*Assistant Examiners.*